US012756906B2

(12) United States Patent
Van Gulick et al.

(10) Patent No.: US 12,756,906 B2
(45) Date of Patent: Oct. 6, 2026

(54) TRIGGER ACTIVATED ENHANCEMENT OF CONTENT USER EXPERIENCE

(71) Applicant: ROKU, INC., San Jose, CA (US)

(72) Inventors: Bob Van Gulick, Austin, TX (US); Chris Nee, San Jose, CA (US); Daniel Levin, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/076,601

(22) Filed: Dec. 7, 2022

(65) Prior Publication Data

US 2024/0196064 A1 Jun. 13, 2024

(51) Int. Cl.

| | |
|---|---|
| ***H04N 21/81*** | (2011.01) |
| ***G10L 15/22*** | (2006.01) |
| ***G10L 15/26*** | (2006.01) |
| ***H04N 21/422*** | (2011.01) |
| ***H04N 21/44*** | (2011.01) |
| ***H04N 21/442*** | (2011.01) |

(52) U.S. Cl.

CPC ......... *H04N 21/8146* (2013.01); *G10L 15/22* (2013.01); *G10L 15/26* (2013.01); *H04N 21/42203* (2013.01); *H04N 21/44* (2013.01); *H04N 21/442* (2013.01); *G10L 2015/223* (2013.01)

(58) Field of Classification Search

CPC ......... H04N 21/8146; H04N 21/42203; H04N 21/44; H04N 21/442; G10L 15/22; G10L 15/26; G10L 2015/223

See application file for complete search history.

(56) References Cited

U.S. PATENT DOCUMENTS

| | | | | |
|---|---|---|---|---|
| 2010/0005084 A1* | 1/2010 | Nguyen | H04N 21/4331 707/E17.014 |
| 2015/0070516 A1* | 3/2015 | Shoemake | H04N 21/4542 348/207.11 |
| 2018/0278973 A1* | 9/2018 | Grover | H04N 21/6125 |
| 2021/0019982 A1* | 1/2021 | Todd | H04N 21/2343 |
| 2023/0186528 A1* | 6/2023 | Eluvan | G06T 11/00 345/633 |

* cited by examiner

*Primary Examiner* — Rong Le

(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for dynamically enhancing the presentation of media content based on the detection of a trigger phrase during playing of the media content. An example embodiment operates by a media device receiving the trigger phrase from a user and generating a content enhancement protocol based on the trigger phrase and a user-supplied enhancement effect. During presentation of the media content, the media device may monitor content metadata associated with the media content to detect the trigger phrase, and upon detection, the media device may initiate the content enhancement protocol on the media content.

20 Claims, 5 Drawing Sheets

400

TRIGGER ACTIVATED ENHANCEMENT OF CONTENT USER EXPERIENCE

BACKGROUND

Field

This disclosure is generally directed to initiating enhancement of media content based on detection of a user-specified trigger within the media content.

Background

With more users consuming media content from home in recent years, there has been increased demand for enhanced content user experiences at home. Content, such as multimedia content, can be delivered from a content source device operated by a content provider to millions of viewers. Each of these viewers may want to customize or enhance the presentation of that content in different ways for each viewer. Current media devices do not provide this capability which detracts from the viewer's enjoyment and ability to interact with otherwise static multimedia content.

SUMMARY

Provided herein are system, apparatus, article of manufacture, method and/or computer program product embodiments, and/or combinations and sub-combinations thereof, for enhancing media content based on a user-specified trigger detected within one or more timeslots in the media content. In some embodiments, media content may be streaming content provided by a media device comprising an audio trigger processing module and a visual effect module. The media device may be connected to a remote control and a display device. The audio trigger processing module can continuously or periodically monitor media content being provided by the media device for a user-specified trigger, such as a phrase or a word. Upon detection of the trigger, the media device may then enhance the media content in a preconfigured manner, such as the display of a visual effect selected by the user concurrently with the display of the media content.

In some embodiments, the media device can receive audio signals, such as from a remote control. The audio signals may represent an audio trigger phrase provided by a user via the remote control. The media device may detect the audio trigger phrase in the audio signal and generate a content enhancement protocol based on the detected audio trigger phrase and other user input, such as a user selection of a visual effect to displayed upon detection of the audio trigger within content metadata of a content stream provided by the media device. The media device may monitor the content metadata of a received content stream for the audio trigger phrase and detect the audio trigger phrase in the content metadata of the received content stream. Based on this detection, the media device may then initiate the content enhancement protocol on the received content stream based on the detecting of the audio trigger phrase.

In some embodiments, the content metadata comprises closed captioning data associated with the received content stream and the media device uses the audio trigger phrase to identify a timeslot in the closed captioning data that corresponds to a timeslot in the received content stream. The content enhancement protocol may include steps for displaying a visual effect concurrently with the received content stream at the timeslot of the content stream that corresponds the timeslot in the closed captioning that that was identified based on the audio trigger phrase.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
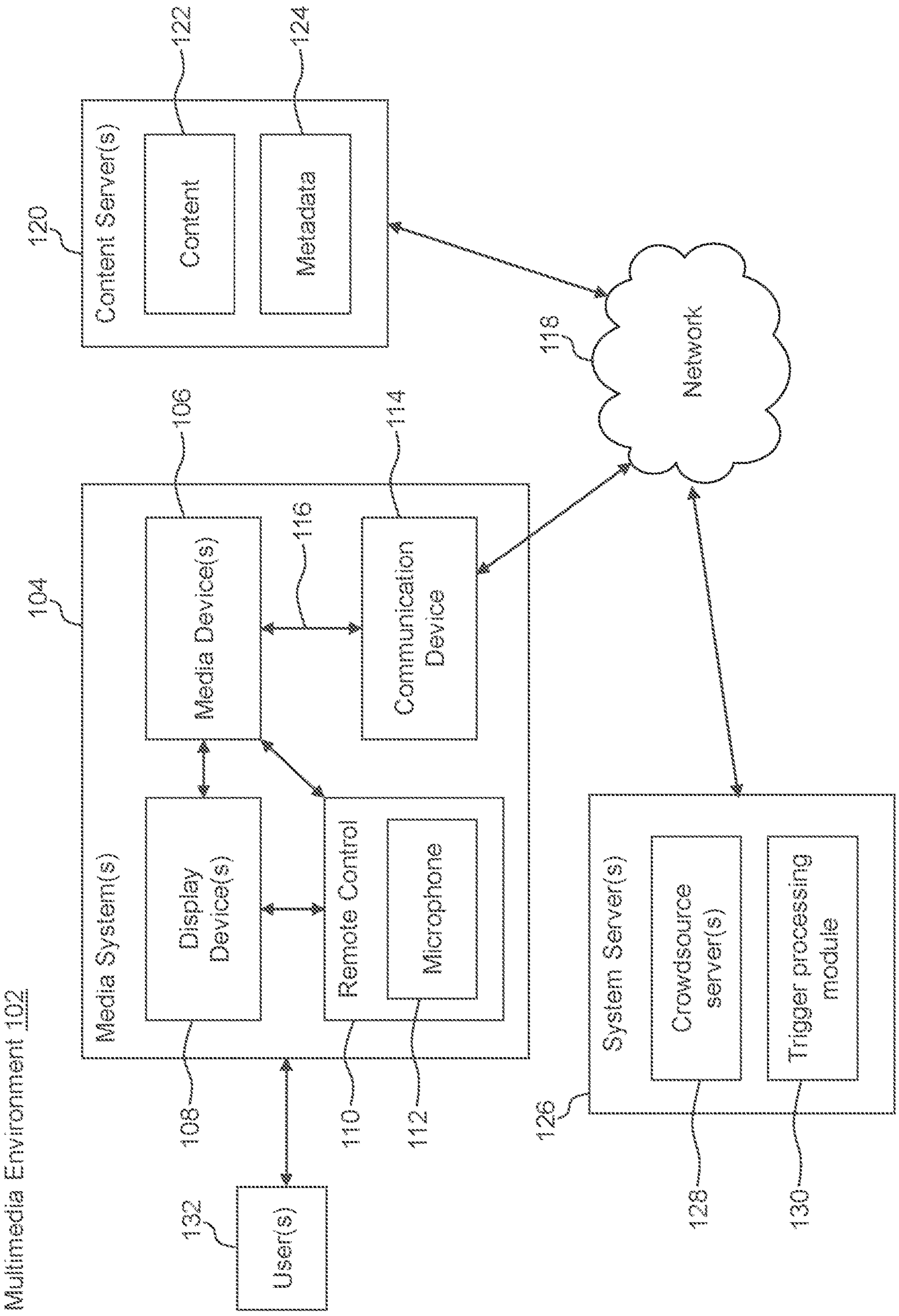
FIG. 1 illustrates a block diagram of a multimedia environment, according to some embodiments.

With the technology advances for multimedia and communication, many types of media content are readily available for streaming and/or display. Viewers are seeking additional ways to interact with the media content beyond merely watching the content on a display. Similarly, advertisers and content providers also seek additional ways to provide additional value and services to viewers to increase engagement between the viewer and the content. For example, media content may be modified to provide enhanced and interactive experiences with viewers. How to effectively and easily provide these enhanced experiences with minimal input from the viewer can therefore be valuable to viewers as well as the content creators.

Provided herein are system, apparatus, device, method and/or computer program product embodiments, and/or combinations and sub-combinations thereof, for dynamically enhancing the presentation of media content for an audience based on information provided by the user. In some embodiments, the information includes a trigger, such as audio phrase or word, that will cause a content enhancement protocol to be initiated while media content is being provided by a media device. In some embodiments, when implemented as a phrase, the trigger may be a single word or multiple words. In some embodiments, the information may further include a user-selected enhancement effect to be played upon detection of the trigger. Examples of an enhancement effect include both visual effects (such as a graphic, a video) and audio effects (such as a sound effect, music).

In some embodiments, the trigger may comprise a trigger phrase and an activation phrase. The trigger phrase may cause the media device to wait for a subsequent phrase or word, or an activation phrase, which is the phrase or word that is detected within the content media. In other words, the trigger phrase may activate the media device to activate a listening mode where the media device is listening for the activation phrase. In some embodiments, the trigger phrase may cause the media device to display a graphic and/or play a sound on a display device or on the remote control indicating that the listening mode has been activated. In some embodiments, the graphic or sound may also be displayed on a user's mobile device such as a phone or smart watch.

The media device may receive the trigger phrase from the user in the form of an audio signal. The media device may then generate the content enhancement protocol linking the trigger phrase to the user-specified enhancement effect (or effects) to be performed when the phrase is detected in the media content. In some embodiments, the media content includes content metadata, such as closed captioning information, and detection of the trigger may include identifying the phrase within the closed captioning information. The media device may provide the media content and while the media content is being provided, the media device may detect the trigger phrase, such as in a background process. Upon detection of the trigger phrase, the media device may initiate the generated content enhancement protocol. In some embodiments, this enhancement protocol includes retrieving a user-selected enhancement effect, playing the enhancement effect at a timeslot of the media content that corresponds to a timeslot when the trigger phrase was detected within the content metadata.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including a content enhancement system for dynamically enhancing the presentation of content based on a detected trigger, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 comprises many devices and can be implemented within a single location, or in distributed locations, such as in one or more of a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. For example, there may be one or more display devices 108 of media system 104 with each display device 108 being located in a separate location. User(s) 132 may operate the media system 104 to select and view content, such as content 122.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections. In some embodiments, communication device 114 can be a part of, integrated with, operatively coupled to, and/or connected to a respective media device 106 and/or a respective display device 108.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. When implemented as a smartphone or tablet, operations of the remote control 110 may be provided by a software program installed on the smartphone or tablet that provide a user interface that includes controls of the remote control 110.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Content server 120, media device 106, display device 108, may be collectively referred to as a media device, which may be an extension of media system 104. In some embodiments, a media device may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source displayed on display device 108.

In some embodiments, metadata 124 comprises data about content 122. For example, metadata 124 may include closed captioning data, such as text data, associated with content 122. Metadata 124 may further include timeslots that link the closed captioning data to the audio data of content 122. The timeslots allow the display of the closed captioning data by display device 108 to be synced with the playback of audio data of content 122 such that the text provided by the closed captioning data matches the timeslot when the audio data is played such as by display device 108 or another sound playback device.

Metadata 124 may further include indicating or related to labels of the materials in the content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some embodiments, content 122 can include a plurality of content items, and each content item can include a plurality of frames having metadata about the corresponding frame (see FIG. 3).

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server 120 together may be referred to as a media server system. An overall media device may include a media server system and media system 104. In some embodiments, a media device may refer to the overall media device including the media server system and media system 104.

The media device(s) 106 may exist in thousands or millions of media systems 104. Accordingly, the media device(s) 106 may lend themselves to crowdsourcing embodiments and, thus, the system server(s) 126 may include one or more crowdsource servers 128.

For example, using information received from the media device(s) 106 in the thousands and millions of media systems 104, the crowdsource server(s) 128 may identify similarities and overlaps between closed captioning requests received by one or more media devices 106 watching a particular movie. Based on such information, the crowdsource server(s) 128 may identify patterns in the closed captioning requests, such as particular requests occurring at particular portions of the movie (for example, when the soundtrack of the movie is difficult to hear). Based on these identified patterns, crowdsource server(s) may generate commands or suggestions to turn closed captioning on or off for the particular movie at the particular portions (as determined from the identified patterns). These commands or suggestions may be associated with the movie and stored as metadata (e.g., metadata 124) for the movie so that subsequent requests for the movie may result in downloading the metadata. Playback of the movie may then result in automatically turning on or off the closed captioning or providing the suggestion (so that the user may manually do so) which results in enhancing users' viewing experience at these portions of the movie. In some embodiments, crowdsource server(s) 128 can be located at content server 120. In some embodiments, some part of content server 120 functions can be implemented by system server 126 as well.

As another example, crowdsource server(s) 128 may initiate a watch party between multiple media devices 106, each of which may located at a different physical location and/or connected to different Wi-Fi networks. Crowdsource server(s) 128 may receive a request from media device 106 to initiate a watch party with other media devices. A watch party may comprise the synchronized playback of content across the multiple media devices 106. Embodiments of the present disclosure may be applied to multiple media devices 106 such that the detection of a trigger by one or more media devices 106 or by system server 126 may result in the content enhancement protocol being executed at the multiple media devices 106. In some embodiments, one media device 106 may be designated as the "host" for the watch party and may be responsible for generating the content enhancement protocol based on a trigger. In some embodiments, the media device 106 may transmit the generated content enhancement protocol to the other media devices that are participating in the watch party so that each media device has the same content enhancement protocol and each media device is responsible for enhancing the presentation of the content in accordance with the protocol. In some embodiments, media device 106 may transmit the content enhancement protocol to system server(s) 126 which may then be responsible for enhancing the presentation of content in accordance with the protocol for each participating media device in the watch party.

In some embodiments, the request to initiate the watch party may include the selected media content to be played at each media device in the watch party. The crowdsource server(s) 128 may receive a trigger and/or one or more enhancement effects from one or more media devices. Based on the selected media content and the received trigger and/or one or more enhancement effects, the crowdsource server(s) 128 may generate the content enhancement protocol and distribute the generated content enhancement protocol to each media device in the watch party. Each media device may then be responsible for executing the enhancement effects at the appropriate timeslot of the content, as will be discussed in further detail below.

The system server(s) 126 may also include a trigger processing module 130. In some embodiments, the trigger may be an audio phrase or word. In some embodiments, the trigger may comprise both a trigger phrase or word which activates a listening mode in the media device 106 and/or the remote control 110, and an activation phrase or word which is used to generate and subsequently initiate the content enhancement protocol. As noted above, the remote control 110 may include a microphone 112 and the content enhancement protocol may be initiated by system server(s) 126, such as during a watch party involving multiple media devices. The microphone 112 may receive audio data from user(s) 132 (as well as other sources, such as the display device 108). In some embodiments, the media device 106 and trigger processing module 130 may be audio responsive, and the audio data may represent verbal commands from the user(s) 132 to control the media device 106 as well as other components in the media system 104, such as the display device 108. In some embodiments, the audio data may include the trigger phrase or words that is to be used for generating, and subsequently initiating, the content enhancement protocol. Trigger processing module 130 may be configured to identify the trigger when it is received from user(s) 132, detect the trigger in media content, including content metadata, and initiating the content enhancement protocol at the one or more media devices. In some embodiments, trigger processing module 130 may be implemented at media system 104, such as in media device 106.

In some embodiments, the audio data received by the microphone 112 in the remote control 110 is transferred to the media device 106, which is then forwarded to the trigger processing module 130 which may be implemented in the system server(s) 126 or in media device 106. The trigger processing module 130 may operate to process and analyze the received audio data to detect the trigger and may initiate (cause the one or more media devices 106 to initiate) the content enhancement protocol.

Figure 2:
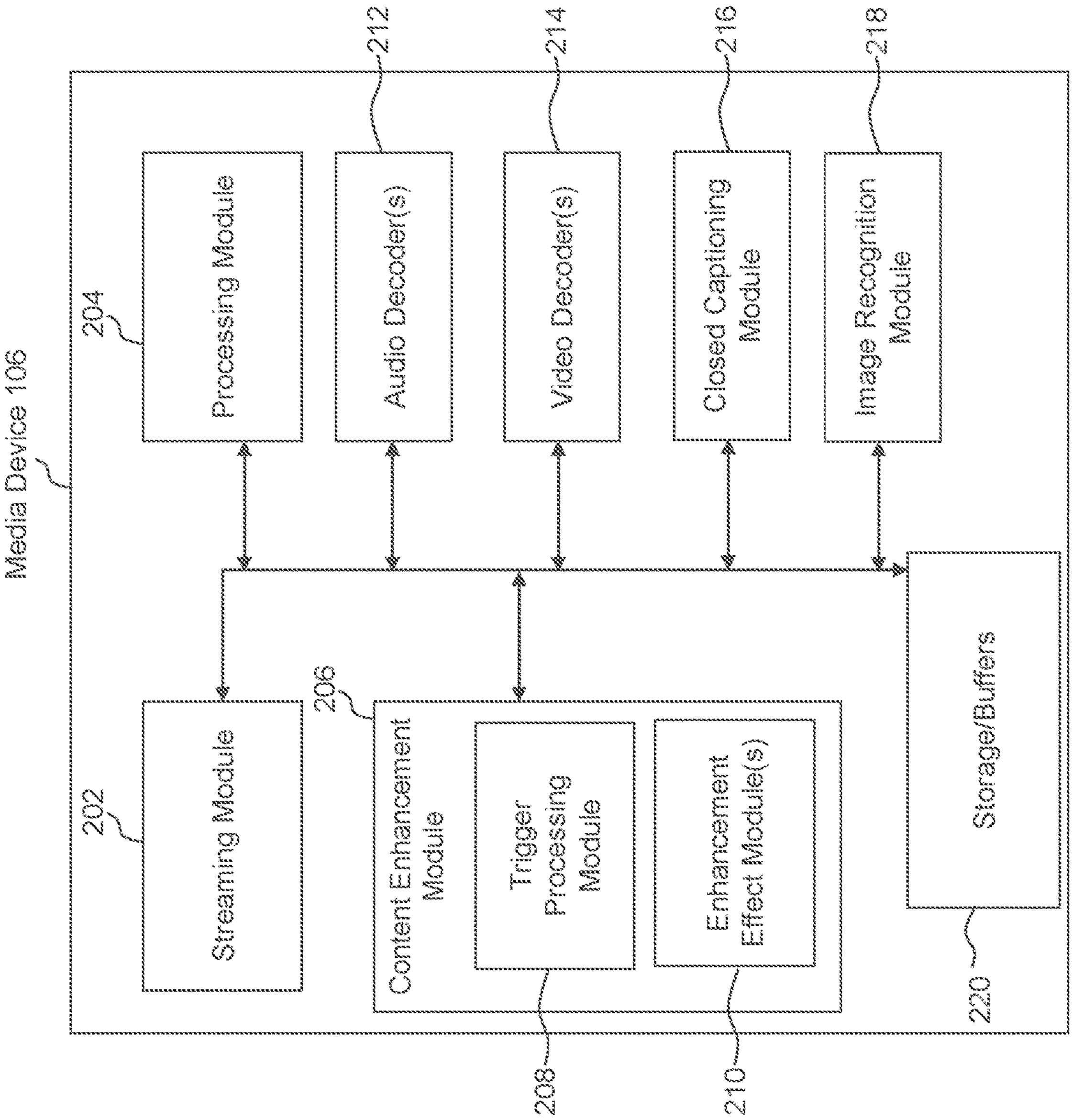
FIG. 2 illustrates a block diagram of a streaming media device, according to some embodiments.

In some embodiments, the audio data may be alternatively or additionally processed and analyzed by trigger processing module 208 in the media device 106 (see FIG. 2). Trigger detection may then be performed at the media device 106, the system server(s) 126, or some combination of both (e.g., where processing may be shared between trigger processing module 130 and trigger processing module 208).

FIG. 2 illustrates a block diagram of an example media device(s) 106, according to some embodiments. Media device(s) 106 may include a streaming module 202, processing module 204, content enhancement module 206, storage/buffers 220, audio decoder 212, video decoder 214, and closed captioning module 216. Content enhancement module 206 may include trigger processing module 208 and enhancement effect module 210.

In some embodiments, content enhancement module 206 may further include a trigger processing module 208 and an enhancement effect module 210. Trigger processing module 208 can be configured to receive user input, such as audio data, from user(s) 132 via, for example, remote control 110. Other types of user input can include image data, infrared data, text data, and touching data, to name just some examples. In some embodiments, trigger processing module 208 can be integrated into media device(s) 106. In some embodiments, sensing module(s) 218 can be integrated to display device(s) 108, remote control 110, or any devices used by user(s) 132 to interact with media systems 104. Media device(s) 106 can receive the commands or instructions from trigger processing module 208 to initiate a content enhancement protocol, such as the display of a visual effect and/or the playing of an audio effect.

Trigger processing module 208 may communicate with enhancement effect module 210 to generate a content enhancement protocol. The enhancement effect module 210 may provide an enhancement effect to be played when a trigger is detected. As part of generating the content enhancement protocol, trigger processing module 208 receives the trigger as described above and enhancement effect module 210 identifies the media content that is having its presentation enhanced based on the trigger and also identifies one or more enhancement effects to be played concurrently with the media content.

In another embodiment, trigger processing module may include an override condition to force initiation of the content enhancement protocol. For example, the override condition may include a user-selectable option to directly initiate and/or manage features of the content enhancement protocol such as the trigger words, the content where the trigger words may apply, and the linked enhancements. In some embodiments, the user may manually select one or more content based on one or more parameters such as title, actor, type of content (e.g., movie, TV show, TV series), a particular character (e.g., "Marty McFly"), and/or a type of scene (e.g., romantic, scenes involving kissing). The override condition may also allow the user to select the one or more trigger words associated with the one or more content and the enhancements to be displayed upon detection of the one or more trigger words.

In some embodiments, the identification of the media content may be based on user input, such as via remote control 110 or media device(s) 106. In some embodiments, the identification of the media content may be included in the audio data that includes the trigger. For example, the user(s) 132 may verbally state the media content in addition to providing the trigger. In some embodiments, the identification of the media content may be provided via text input in response to the display of a user interface on a display device, such as display device 108.

In some embodiments, the identification of the one or more enhancement effects may be based on user input, such as via remote control 110 or media device(s) 106. The user input may include information in the audio data that includes the trigger. For example, the user(s) 132 may verbally state the desired enhancement effect (e.g., "hearts") to be displayed upon detected of the trigger (e.g., "kiss" or the name of a movie character) within the selected media content (e.g., a romantic comedy). In some embodiments, the one or more enhancement effects may be preselected based on the identified media content. For example, a particular movie may have preselected enhancement effects to emphasize the mood of the movie; a scary movie may have different preselected enhancement effects compared to a romantic comedy. Accordingly, the type or particular instance of the media content may be associated with certain enhancement effects that can be further selected or configured via user input.

Trigger processing module 208 may also be configured to determine whether to apply a content enhancement protocol on media content that is currently being provided by media device 106. In some embodiments, trigger processing module 208 may identify media content is currently being streamed. Trigger processing module 208 may then determine whether there are any content enhancement protocols (stored in storage/buffers 220, see FIG. 3) associated with the current media content. If there is an associated protocol, trigger processing module 208 may identify the one or more triggers specified in the protocol and provides the one or more triggers to closed captioning module 216 and/or image recognition module 218 for monitoring the content metadata to detect the one or more triggers. Upon detecting by closed captioning module 216 and/or image recognition module 218, trigger processing module 208 may provide an instruction to initiate enhancement of the media content.

In some embodiments, trigger processing module 208 may receive the one or more triggers from a third-party server, such as an advertiser server or a content provider server. In such embodiments, the one or more triggers may be linked to certain actions provided by the third-party server. For example, the one or more triggers may be linked to an advertisement campaign provided by the advertiser server. The advertisement campaign may provide discount codes, limited time offers, and the like, based on a predetermined amount or random amount of times that the one or more triggers are utilized. Other examples of actions include providing specific effects from third-party server that are associated with the one or more triggers. For example, these specific effects may include displaying supplemental advertisements provided by the advertiser server or supplemental content provided by the content provider server.

Effect enhancement module(s) 218 can enhance the presentation of content to be played on display device(s) 108 based on the one or more enhancement effects identified in the content enhancement protocol associated with the media content. In some embodiments, effect enhancement module (s) 218 may receive an indication from trigger processing module 208 that a trigger has been detected during playback of the media content. The effect enhancement module(s) 218 may then identify the one or more enhancement effects to be displayed from the content enhancement protocol, determine the appropriate timeslots within the media content to execute the enhancement effects. In some embodiments, executing the enhancement effect means display the enhancement effect (e.g., if the enhancement effect is a visual effect), playing the enhancement effect (e.g., if the enhancement effect is a sound effect), or both (e.g., if the enhancement effect includes both visual and sound effects). The effect enhancement module(s) may then display or play the enhancement effects at the determined timeslots in synchronization with the media content so that the enhancement effects are displayed or played when the trigger is shown on the screen (e.g., if the trigger includes one or more keywords regarding scenes in the media content) or output via a speaker (e.g., if the trigger includes one or more words spoken in the media content). The timeslots refers to the point in the media content where the trigger is shown or output during playback of the media content and enables effect enhancement module(s) 218 to synchronize the enhancement effects to the appropriate timeslot.

In some embodiments, user(s) 132 may interact with remote control 110 and microphone 112 to generate the content enhancement protocols for respective media content via verbal commands provided via microphone 112. In some embodiments, user(s) 132 may initiate a listening mode of content enhancement module 206. In listening mode, content enhancement module is waiting to receive audio data that includes one or more of a trigger (e.g., a phrase or a word), selected media content to be associated with the trigger, and one or more enhancement effects. Trigger processing module 208 may also include a speech recognition system that can recognize the speech in the audio data and convert the speech into text for storing in a content enhancement protocol. In some embodiments, the listening mode may be activated via a first audio command, such as a trigger phrase, by a physical button press on remote control 110, a button press on a soft key (e.g., that is displayed on a software graphics user interface of an application installed on a smartphone), by a combination of button presses or soft keys, or via a menu selection on a menu displayed on display device 108. In some embodiments, the combination of button presses or soft keys may be initially hidden from the user and provided as a "Easter egg" such as an advertising campaign. For example, the combination of button presses or soft keys may be provided by the third-party server and subsequently displayed to a user after the third-party server receives a predetermined action or response from a user device. Examples of such predetermined actions or responses include entering an activation code (e.g., that is provided via purchase of a related content) or responding/interacting with questions provided from the third-party server.

In some embodiments, media device(s) 106 can communicate with a speech recognition system and receive the text for the one or more utterances capture by an audio sensing module. In some embodiments, the speech recognition system can be included in media device(s) 106 or media systems 104 to recognize the speech in the captured utterances. In some embodiments, the speech recognition system can be included in system server(s) 126, such as audio command processing module 130, to communicate with media device(s) 106. In some embodiments, the speech recognition system can be a third party system communicating with media device(s) 106.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user(s) 132 may interact with the media device(s) 106 via, for example, the remote control 110. For example, the user 132 may use the remote control 110 to interact with the content enhancement module 206 of the media device 106 to provide any one of a trigger, the media content, and the one or more enhancement effects. The content enhancement module 206 may generate the content enhancement protocol based on the trigger, the media content, and the one or more enhancement effects and interact with streaming module 202 to retrieve the selected media content from the content server(s) 120 over the network 118. The content server(s) 120 may transmit the requested media content to the streaming module 202. The media device 106 may transmit the received content to the display device 108 for playback.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 220 for later playback on display device 108. Storage/buffers 220 may also store one or more content enhancement protocols (see FIG. 3).

In some embodiments where the trigger is associated with a word or words spoken in the media content (e.g., a word or words spoken characters in the media content), content enhancement module 206 may instruct closed captioning module 216 to monitor metadata 124, such as closed captioning data, during playback of content 122. Monitoring metadata 124 may include performing text-based analysis of the data, such as performing a keyword search of the closed captioning data to identify the trigger within the metadata 124. In some embodiments where the trigger is provided as part of audio data (e.g., via microphone 112), trigger processing module 208 may convert the audio portion of the audio data into a text format that can be used for the keyword search of the closed captioning data. In some embodiments, trigger processing module 208 may provide the trigger to the closed captioning module 216 in text format.

Upon detection of the trigger within the closed captioning data, closed captioning module 216 may further be configured to send a signal to content enhancement module 206 to initiate the content enhancement protocol that is associated with the detected trigger. Closed captioning module 216 also provides additional information, such as one or more timeslots in the closed captioning data where the trigger was detected and one or more timeslots in the content data that corresponds with the one or more timeslots in the closed captioning data. In some embodiments, closed captioning module 216 may prefetch the closed captioning data and return every instance in the closed captioning data where the trigger was found in the prefetched closed captioning data. Each instance of the trigger may be associated with one or more timeslots in the closed captioning data. The one or more timeslots in the closed captioning data may be used to identify corresponding one or more timeslots in the content media. The content enhancement protocol may then be configured to play the selected enhancement effects in synchronization with the corresponding one or more timeslots in the media content data.

In some embodiments where the closed captioning data is prefetched, the content enhancement protocol may be modified to include the corresponding one or more timeslots in the media content data before the media content is played. In this manner, the timeslots are identified prior to playing of the media content. In other embodiments, monitoring of the closed captioning data may occur in real-time while the media content is being played.

In some embodiments where the trigger is associated with a description of a visual scene in the media content, content enhancement module 206 may instruct image recognition module 218 to monitor metadata 124, such as labels identifying scenes in the media content, during playback of content 122. Image recognition module 218 may be configured to identify visual scenes in the content 122 that correspond to the trigger. For example, the trigger may specify a "kiss" and image recognition module 218 perform image recognition on content 122 for any scenes that include a "kiss" as specified by the trigger. Image recognition module 218 may then provide one or more timeslots of the content where the trigger was detected. The content enhancement protocol may then be initiated at each timeslot to display the selected enhancement effect concurrently with the media content.

In some embodiments, the trigger may be detected using audio decoder(s) 212 which is outputting audio. Audio decoder(s) 212 may be configured to detect the trigger in the audio data of content by, for example, performing audio recognition on the audio data. In such embodiments, the trigger may not need to be converted into a text format (such as to be used by closed captioning module 216). In some embodiments, trigger processing module 208 may process the trigger input provided by user(s) 132 so that it can be utilized by audio decoder(s) 212 for detection in the audio data of the content. For example, trigger processing module 208 may convert the trigger input from one audio format to a second audio format that is recognized by audio decoder(s) 212 or that may make it easier for audio decoder(s) 212 to perform the comparison with the audio data.

In some embodiments, image recognition module 218 may perform image recognition on content 122 as it is being streamed by media device 106 in addition to or alternative to monitoring metadata 124. For example, image recognition module 218 may apply image recognition techniques on scenes to identify objects, actor/actresses, and actions taking place during the scene. Image recognition module 218 may provide one or more timeslots of the content where the trigger was detected based on this identification.

Figure 3:
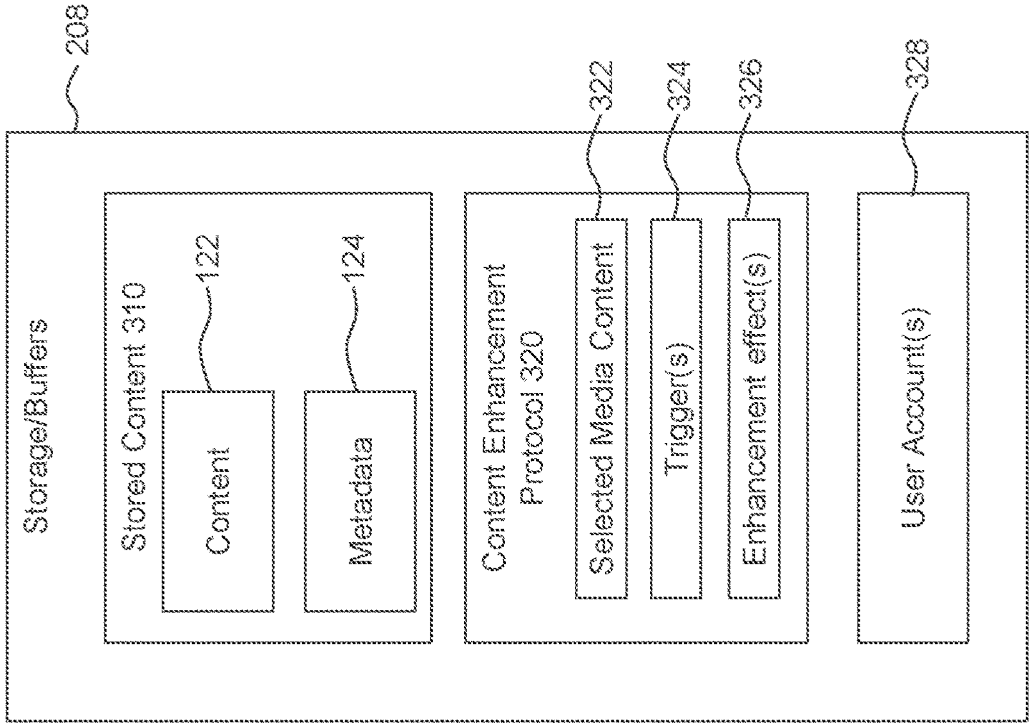
FIG. 3 illustrates a block diagram of storage in the media device having content metadata and content enhancement protocols, according to some embodiments.

FIG. 3 illustrates storage/buffers 220 that stores information relating to stored content, such as stored content 310, and content enhancement protocols, such as content enhancement protocol 320, according to some embodiments. Stored content 310 may represent data that is currently being streamed by media device 106 for display by display device 108 and temporarily stored in storage/buffers 220 before being played. Stored content 310 may include media content 122 which includes video and audio data and metadata 124 which includes information about media content 122, such as closed captioning data, scene labels, actor information, and the like. Content 122 and metadata 124 may be buffered in storage/buffers 220 during playback of content 122. Closed captioning module 216 and image recognition module 218 may analyze data in stored content 310 to identify the provided trigger for a content enhancement protocol.

Examples of closed captioning data include the caption data associated with content 122, the timeslots of the caption data, and the timeslots of audio in content 122 that correspond to the caption data. The timeslot information allows the audio for content 122 and the caption data to be synchronized while content 122 is being played.

Scene labels may include descriptions of scenes in content 122 and, like closed captioning data, may be used as a basis for identifying a trigger within content 122. Examples of scene labels include information about the scene such as keywords describing objects appearing in the scene, actors/actresses appearing in the scene, a description of the scene, and actions being taken by the actors/actresses/objects in the scene, as well as the timeslots in which these particular objects, actors/actresses, and actions are occurring in media content 122. Scene labels may be used to detecting matches to a provided trigger. As one example, a trigger may be "kiss" and the scene labels may be used to identify scenes that involving kissing. Once identified, the appropriate timeslots may be next identified. Examples of timeslots include a timeslot or timeslots during which the trigger is taking place in the scene and a beginning timeslot and ending timeslot for the scene in which the trigger takes place.

Storage/buffers 220 may also store one or more content enhancement protocols 320, which may include selected media content 322, one or more triggers 324, and one or more enhancement effects 326. Content enhancement protocol 320 may be generated by enhancement effect module (s) 210 based on one or more triggers 324 that are provided via user input and subsequently initiated based on the detection of the trigger in media content (e.g., content 122). During playback of a media content by media device 106, trigger processing module 208 may interact with content enhancement protocols stored in storage/buffers 220 to retrieve the respective triggers and the selected media content 322 and determine whether the current media content has any associated triggers. If there are, trigger processing module 208 may initiate monitoring of the playback of the media content which may include initiating closed captioning module 216 and/or image recognition module 218 to begin monitoring closed captioning data and visual data/scene labels, respectively, in order to detect the one or more triggers associated with the current media content.

Content enhancement protocol 320 can include instructions to enhance the presentation of selected media content 322 to be played on display device(s) 108. In some embodiments, selected media content 322 may comprise a single media content or multiple media content. For example, selected media content 322 may include one movie or several movies. In some embodiments, selected media content 322 may comprise a genre of media content. For example, selected media content 322 may include "Action" or "Romantic Comedy." In some embodiments, selected media content 322 may comprise a content type. For example, selected media content 322 may include movie, TV show, or sporting event. Further, in some embodiments, selected media content 322 may be left blank or null in which case content enhancement protocol could be applied to any media content provided by media device 106.

In some embodiments, enhancement of the presentation may include concurrently displaying the one or more enhancement effect(s) 326 during the presentation of the selected media content 322. For example, the one or more enhancement effect(s) 326 and the selected media content 322 may be displayed concurrently on display device 108. In some embodiments, the one or more enhancement effect(s) 326 may be implemented as an overlay (e.g., a transparent visual, a graphic) displayed over the selected media content 322 while it is being played on display device 108. In some embodiments, the one or more enhancement effect(s) 326 may be or include an audio effect that is played over the audio data of the selected media content 322.

As one non-limiting example, a trigger(s) 324 may be the word "McFly," the selected media content 322 may be the Back to the Future trilogy (i.e., three separate movies, Back to the Future, Back to the Future H, and Back to the Future III), and the enhancement effect(s) 326 may be fireworks and one or more sound effects. In this example, every time the word "McFly" is output as audio data during playback of any one of the movies in the Back to the Future trilogy (e.g., via the detection of the keyword within closed captioning data by closed captioning module 216), the respective fireworks and one or more sound effects are played concurrently with the scene on display device 108.

In some embodiments, content enhancement protocol 320 may include instructions regarding the playing of enhancement effect(s) 326. For example, there may be time-based conditions on the playback of enhancement effect(s) 326. Some enhancement effect(s) 326 may include predetermined time periods for playback such that these effects will play for the full time period from start to end. As another example, some enhancement effect(s) 326 may have variable length time periods for playback such that their playback can be adjusted based on the content being played so as to not to interrupt the viewing of the content.

When a trigger(s) 324 is detected during playback of selected media content 322, content enhancement protocol 320 may provide the corresponding enhancement effect from enhancement effect(s) 326 for display on display device 108.

User account(s) 328 may include profiles of one or more users, such as one or more members of a household that utilize media device 106. There may be one or more user profiles for the one or more members of the household. In some embodiments, the user profile 328 can include respective user preferences and the viewing history for each member of the household associated with user account 328. User profile 328 can also include information about user settings of media systems 104 and media content by user(s) 132 accessed through user account 328. For example, user profile 328 may include preferred enhancement effects, preferred content type, preferred sound effects, user's favorite genres, and content restrictions. The preferred enhancement effects may be preselected by user, such as via a user interface provided by media device 106, or may be based on frequency or history of usage by the user. The user profile 328 may track usage of enhancement effects based on how often they are used and which content they were used (e.g., which movie, TV show, or other content type). In some embodiments, user profile 434 can include a category identifying each user(s) 132. For example, the category of user(s) 132 can include adults, men, women, children under seventeen, children under thirteen, toddlers, a member of household, guests, and other categories.

Information in user profile 328 may be used to provide suggested enhancement effects for other types of media content. Media device 106 may provide tracked enhancement effect information to crowdsource server(s) 128 to identify usage patterns associated with enhancement effects across multiple media devices. For example, crowdsource server(s) 128 may identify certain enhancement effects (e.g., displaying heart emojis) are more popular with certain content types (e.g., romantic comedies). In some embodiments, user profile 328 may further include a content search history and the crowdsource server(s) 128 may include content search history from multiple users. Crowdsource server(s) 128 may organize content search history based on popularity and pattern matches to identify additional usage patterns involving content. Crowdsource server(s) 128 may utilize the popularity and pattern matches as part of implementing watch parties between multiple media devices. Knowledge of popularity and pattern matches may increase the confidence in creating watch parties that are relevant to particular user(s) 132.

Enhancement of Content Presentation Based on Trigger

Figure 4:
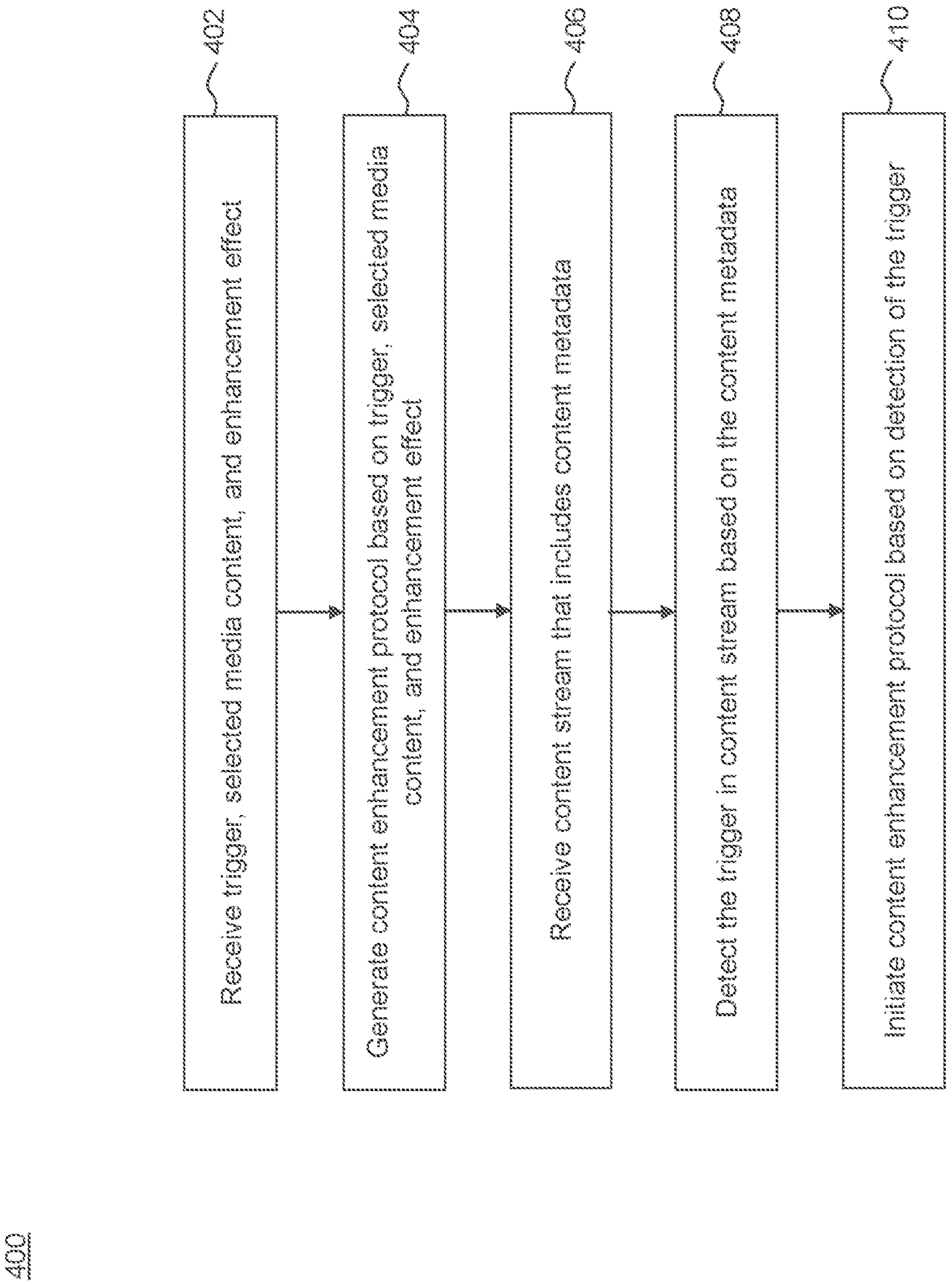
FIG. 4 is a flowchart illustrating a method for determining initiating a content enhancement protocol for a content stream, according to some embodiments.

FIG. 4 is a flowchart illustrating a content enhancement method 400 for determining a category of an audience based on captured image information, according to some embodiments. Method 400 can be performed by processing logic that can comprise hardware (e.g., circuitry, dedicated logic, programmable logic, microcode, etc.), software (e.g., instructions executing on a processing device), or a combination thereof. As a non-limiting example of FIGS. 1-3, one or more functions described with respect to FIG. 4 may be performed by a media device (e.g., media device 106 of FIG. 1) or a display device (e.g., display device 108 of FIG. 1). In such an embodiment, any of these components may execute code in memory to perform certain steps of content enhancement method 400 of FIG. 4. While content enhancement method 400 of FIG. 4 will be discussed below as being performed by certain components of multimedia environment 102, other components may store the code and therefore may execute content enhancement method 400 by directly executing the code. Accordingly, the following discussion of content enhancement method 400 will refer to components of FIGS. 2 and 3 as an exemplary non-limiting embodiment. Moreover, it is to be appreciated that not all steps may be needed to perform the disclosure provided herein. Further, some of the functions may be performed simultaneously, in a different order, or by the same components than shown in FIG. 4, as will be understood by a person of ordinary skill in the art.

In step 402, media device 106 receives the user-provided trigger, selected media content, and enhancement effect. The trigger may include one or more triggers, the selected media content may include one or more media content, and the enhancement effect may include one or more enhancement effects. In some embodiments, media device 106 receives audio data from microphone 112 which may include one or more of the trigger, the selected media content and enhancement effect. In some embodiments, media device 106 receives user input via a graphical user interface (e.g., a menu) displayed on display device 108 which may include one or more of the trigger, the selected media content and enhancement effect. In some embodiments, media device 106 retrieves one or more preferences from user account(s) 328 which may include which may include one or more of the trigger, the selected media content and enhancement effect. In some embodiments, media device 106 identifies the current content media being provided and uses that identified content media as the selected media content. In some embodiments, the trigger, selected media content, and enhancement effect may be received via any combination of the above methods.

In some embodiments, step 402 is performed after the user activates a listening mode in the media device 106. When media device 106 is in listening mode, it processes the next audio data as the trigger. The user may activate the listening mode via a predefined audio command (e.g., "party mode"), a button press or a combination of button presses on remote control 110, or selection from a graphical user interface such as a menu on display device 108.

In step 404, media device 106 may generate the content enhancement protocol based on the received information. For example, content enhancement module 206 may associate the received trigger, selected media content, and enhancement effect and store them together in storage/buffers 220. In some embodiments, the content enhancement protocol may be generated prior to the media device 106 receiving any content stream, i.e., before the user requests any particular content to be provided by media device 106. In some embodiments, the content enhancement protocol may be generated while the content stream is currently being provided by media device 106. For example, media device 106 may currently be streaming a movie, a TV show, or live content when it receives the trigger. Media device 106 may then automatically associate the current content stream with the received trigger and any enhancement effects to generate the content enhancement protocol. In other words, the trigger, selected media content, and enhancement effects may be identified in the same request (e.g., in audio data received from microphone 112) or may be identified separately from each other (e.g., trigger may be received in audio data received from microphone 112, selected media content may be identified based on the media content currently being provided by media device 106, and enhancement effects may be received from one of the audio data or the user preferences in their user account 328).

In some embodiments, the content enhancement protocol may be generated with the timeslot information that indicates where the trigger occurs within the content. For example, media device 106 may prefetch the content metadata, identify timeslots where the trigger occurs based on the content metadata, and populate the content enhancement protocol with the timeslot information. In such embodiments, media device 106 may only monitor the timeslot information of media content (i.e., not the trigger), compare the timeslot information of the media content with the timeslot information in the content enhancement protocol, and execute the enhancement effects based any matches determined based on this comparison.

In some embodiments, generating the content enhancement protocol may occur on a remote device such as system server(s) 126. In such embodiments, media device 106 provides the trigger, selected media content, and the selected enhancement effects to the remote device which may populate the content enhancement protocol with timeslot information identifying the timeslots where the trigger occurs in the selected media content. The remote device may then provide the generated content enhancement protocol to media device 106 which may then monitor the timeslot information in order to determine when to execute the enhancement effects.

In step 406, media device 106 receives a content stream for display on display device 108. Content stream may include media content selected by a user such as a movie, TV show, live content (e.g., a sporting event or an awards show), social media videos, or any other media content that includes content metadata. Media device 106 determines that the current content stream includes the selected media content identified in a content enhancement protocol. For example, the media device 106 may compare the title of the current content stream (e.g., from the content metadata) with the selected media content identified in the content enhancement protocol to determine if there is a match. A current content stream may refer to the content stream that is currently being provided by media device 106 for display to the user. Media device 106 may perform the determination every time a new content stream is being provided (e.g., when the user switches to another movie or show).

In step 408, media device 106 monitors the content metadata associated with the content stream in order to detect the trigger in the content stream. For example, media device 106 retrieves the trigger from the identified content enhancement protocol and uses they trigger to perform a search of the content metadata. In embodiments where the trigger is audio (e.g., audio output by the content stream), then media device 106 may perform a keyword search of closed captioning data in the content metadata, for example, by using closed captioning module 216. In embodiments where the trigger is a description related to a scene in the content (e.g., a description of a scene, objects in a scene, actors/actresses in a scene), then media device 106 may perform a keyword search of scene labels in the content metadata, by using closed captioning module 216, or based on information provided by image recognition module 218 as it monitors the content stream as the stream is being provided by media device 106.

In step 410, upon detection of the trigger in the content, media device 106 initiates the content enhancement protocol that corresponds to the detected trigger. The initiation may include by retrieval of the enhancement effect from the protocol and executing the enhancement effect, such as by displaying the enhancement effect on display device 106 and/or playing the enhancement effect as audio via the display device 106 or another audio output device connected to media device 106.

Example Computer System

Figure 5:
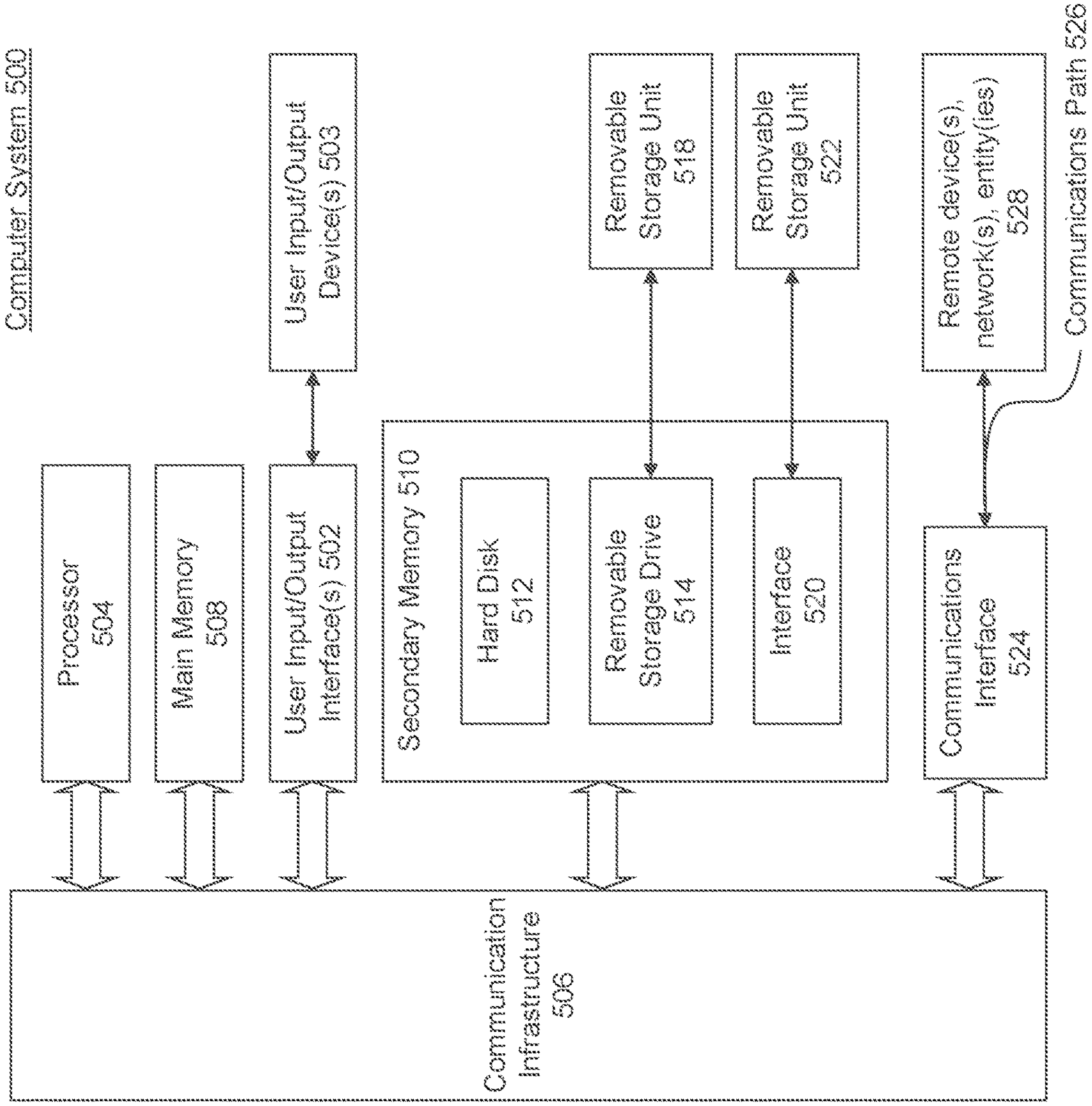
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:

one or more memories;

a trigger processing module; and at least one processor coupled to the one or more memories and the trigger processing module, and configured to perform operations comprising:

detecting, via received audio signals, an audio trigger phrase, wherein the audio trigger phrase comprises a description of a visual scene in media content;

displaying, on a display device in communication with the media device, a graphical user interface for receiving a selection of the media content and user input, wherein the user input comprises a selection of an audio effect that is associated with the audio trigger phrase;

receiving, from a remote control in communication with the media device and responsive to displaying the graphical user interface, the selection of media content and the user input;

generating a content enhancement protocol based on the audio trigger phrase, the selection of media content, and the user input;

initiating a watch party session with one or more other media devices, wherein the watch party session is configured to provide synchronized playback of a received content stream associated with the selection of media content to the media device and the one or more other media devices, wherein initiating the watch party session comprises transmitting a request to a server, and wherein the request is configured to identify the received content stream to be synchronized with the one or more other media devices by the server;

transmitting, via the server, the content enhancement protocol to the one or more other media devices, wherein the content enhancement protocol is configured to provide synchronized enhancement of the received content stream to the media device and the one or more other media devices within the watch party session, wherein to provide the synchronized enhancement at the media device, the content enhancement protocol is further configured to perform operations comprising:

monitoring, by the trigger processing module, content metadata of a received content stream, wherein the content metadata is provided based on a scene label or based on a recognized scene in the media content of the received content stream;

detecting, based on the monitoring, the audio trigger phrase in the content metadata, wherein the detecting is based on matching the description of the visual scene with the scene label or the recognized scene in the media content; and initiating the content enhancement protocol on the received content stream based on the detecting of the audio trigger phrase, wherein initiating the content enhancement protocol plays the audio effect using the media device.

2. The media device of claim 1, wherein the received audio signals are received by the media device from the remote control.

3. The media device of claim 1, wherein the received content stream comprises video data and the content metadata further comprises closed captioning data associated with the video data.

4. The media device of claim 3, the operations further comprising:

receiving a second trigger phrase; and generating a second content enhancement protocol based on the second trigger phrase, wherein monitoring the content metadata comprises:

prefetching the closed captioning data; and monitoring the prefetched closed captioning data for the second trigger phrase.

5. The media device of claim 4, the operations further comprising:

detecting the second trigger phrase in the content metadata;

converting the second trigger phrase into a text phrase; and identifying the text phrase at one or more timeslots in the closed captioning data.

6. The media device of claim 5, wherein to initiate the content enhancement protocol, the operations further comprising:

identifying one or more timeslots in the video data corresponding to the one or more timeslots in the closed captioning data; and causing a display of a visual effect at the one or more timeslots in the video data concurrently with the video data.

7. The media device of claim 6, wherein the media device is connected to the display device and the media device causes the display of the visual effect at the one or more timeslots in the video data concurrently with the video data on the display device.

8. The media device of claim 7, wherein the visual effect is an overlay displayed over the video data on the display device.

9. The media device of claim 6, wherein the display of the visual effect is for a predetermined period of time.

10. The media device of claim 6, wherein the monitoring the content metadata occurs while the video data is displayed on the display device.

11. The media device of claim 3, wherein the user input specifies a visual effect and wherein generating the content enhancement protocol comprise:

associating the detected audio trigger phrase with the visual effect; and providing the audio trigger phrase to the trigger processing module for monitoring the video data.

12. A computer-implemented method, comprising:

detecting, via received audio signals, an audio trigger phrase, wherein the audio trigger phrase comprises a description of a visual scene in media content;

displaying, on a display device in communication with a media device, a graphical user interface for receiving a selection of the media content and user input, wherein the user input comprises a selection of an audio effect that is associated with the audio trigger phrase;

receiving, from a remote control in communication with the media device and responsive to displaying the graphical user interface, the selection of media content and the user input;

generating a content enhancement protocol based on the audio trigger phrase, the selection of media content, and the user input;

initiating a watch party session with one or more other media devices, wherein the watch party session is configured to provide synchronized playback of a received content stream associated with the selection of media content to the media device and the one or more other media devices, wherein initiating the watch party session comprises transmitting a request to a server, and wherein the request is configured to identify the received content stream to be synchronized with the one or more other media devices by the server;

transmitting, via the server, the content enhancement protocol to the one or more other media devices, wherein the content enhancement protocol is configured to provide synchronized enhancement of the received content stream to the media device and the one or more other media devices within the watch party session, wherein to provide the synchronized enhancement at the media device, the content enhancement protocol further comprises instructions for:

monitoring, by a trigger processing module, content metadata of a received content stream, wherein the content metadata is provided based on a scene label or based on a recognized scene in the media content of the received content stream;

detecting, based on the monitoring, the audio trigger phrase in the content metadata, wherein the detecting is based on matching the description of the visual scene with the scene label or the recognized scene in the media content; and initiating the content enhancement protocol on the received content stream based on the detecting of the audio trigger phrase, wherein initiating the content enhancement protocol plays the audio effect using the media device.

13. The computer-implemented method of claim 12, wherein the received audio signals are received by the media device from the remote control separate from the media device.

14. The computer-implemented method of claim 12, wherein the received content stream comprises video data and the content metadata further comprises closed captioning data associated with the video data.

15. The computer-implemented method of claim 14, further comprising:

receiving a second trigger phrase;

generating a second content enhancement protocol based on the second trigger phrase, wherein monitoring the content metadata further comprises:

prefetching the closed captioning data; and monitoring the prefetched closed captioning data for the second trigger phrase.

16. The computer-implemented method of claim 15, further comprising:

detecting the second trigger phrase in the content metadata;

converting the second trigger phrase into a text phrase; and identifying the text phrase at one or more timeslots in the closed captioning data.

17. The computer-implemented method of claim 16, wherein initiating the content enhancement protocol includes:

identifying the one or more timeslots in the video data corresponding to the one or more timeslots in the closed captioning data; and causing a display of a visual effect at the one or more timeslots in the video data concurrently with the video data.

18. The computer-implemented method of claim 14, wherein the user input specifies a visual effect and wherein generating the content enhancement protocol includes:

associating the audio trigger phrase with the visual effect; and providing the audio trigger phrase to the trigger processing module for monitoring the video data.

19. A non-transitory computer-readable medium having instructions stored thereon that, when executed by a media device, cause the media device to perform operations comprising:

detecting, via received audio signals, an audio trigger phrase, wherein the audio trigger phrase comprises a description of a visual scene in media content;

displaying, on a display device in communication with the media device, a graphical user interface for receiving a selection of the media content and user input, wherein the user input comprises a selection of an audio effect that is associated with the audio trigger phrase;

receiving, from a remote control in communication with the media device and responsive to displaying the graphical user interface, the selection of media content and the user input;

generating a content enhancement protocol based on the audio trigger phrase, the selection of media content, and the user input;

initiating a watch party session with one or more other media devices, wherein the watch party session is configured to provide synchronized playback of a received content stream associated with the selection of media content to the media device and the one or more other media devices, wherein initiating the watch party session comprises transmitting a request to a server, and wherein the request is configured to identify the received content stream to be synchronized with the one or more other media devices by the server;

transmitting the content enhancement protocol to the one or more other media devices, wherein the content enhancement protocol is configured to provide synchronized enhancement of the received content stream to the media device and the one or more other media devices within the watch party session, wherein to provide the synchronized enhancement at the media device, the content enhancement protocol further comprises operations for:

monitoring, by a trigger processing module, content metadata of a received content stream, wherein the content metadata is provided based on a scene label or based on a recognized scene in the media content of the received content stream;

detecting, based on the monitoring, the audio trigger phrase in the content metadata, wherein the detecting is based on matching the description of the visual scene with the scene label or the recognized scene in the media content; and initiating the content enhancement protocol on the received content stream based on the detecting of the audio trigger phrase, wherein initiating the content enhancement protocol plays the audio effect using the media device.

20. The non-transitory computer-readable medium of claim 19, wherein the received audio signals are received by the media device from the remote control separate from the media device.

* * * * *